Feb. 12, 1924.
K. WILLIAMS
1,483,147
ASSEMBLING MACHINE
Filed June 13, 1921
3 Sheets-Sheet 3
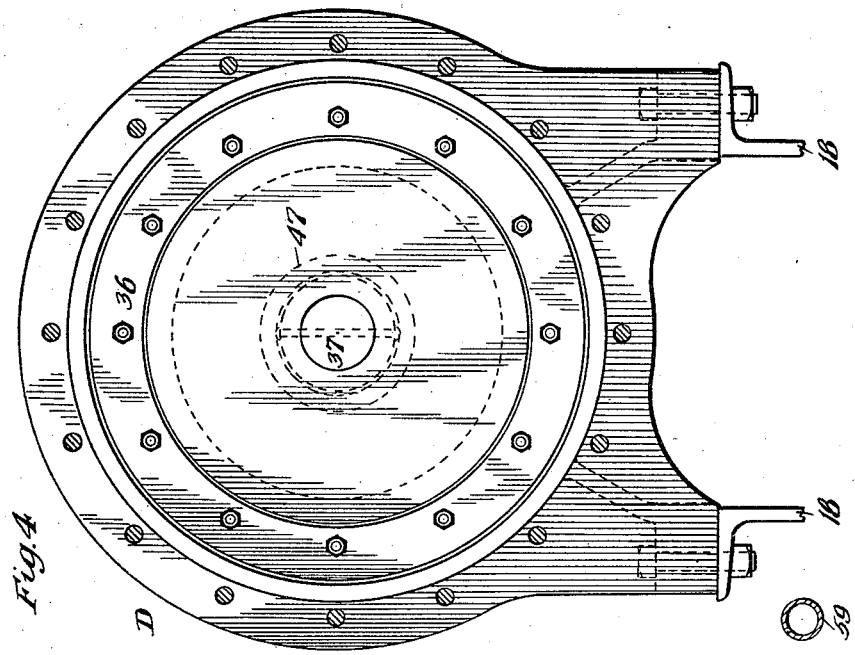
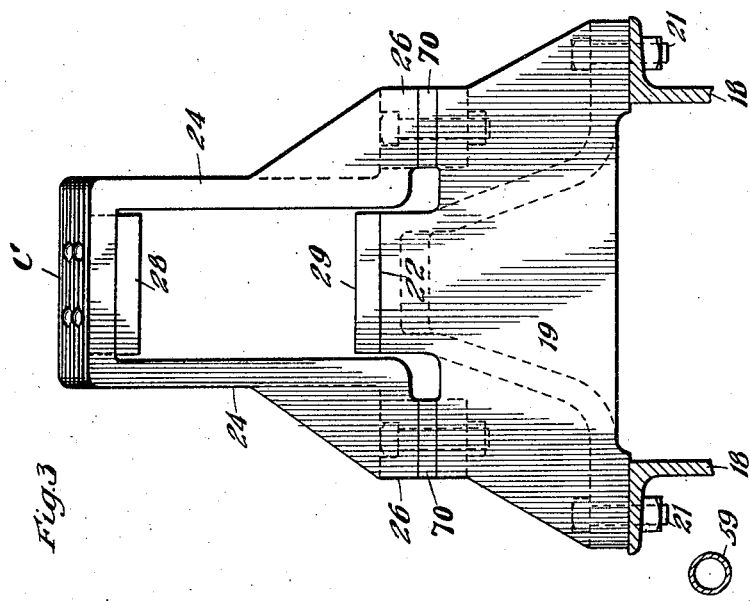
Witnesses
Wm. Geiger
Inventor
Keith Williams
By Geo. I. Haight
His Atty.

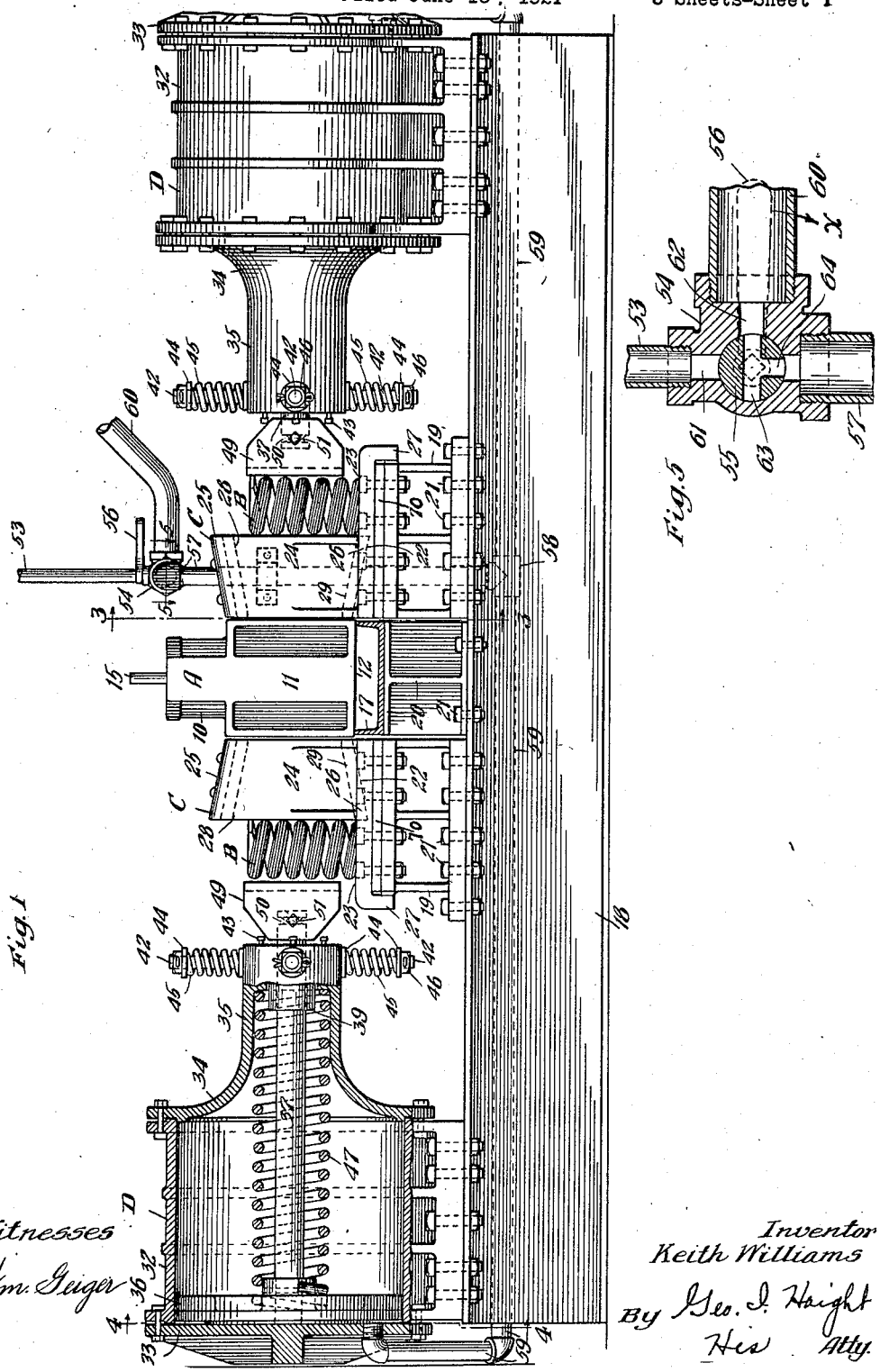

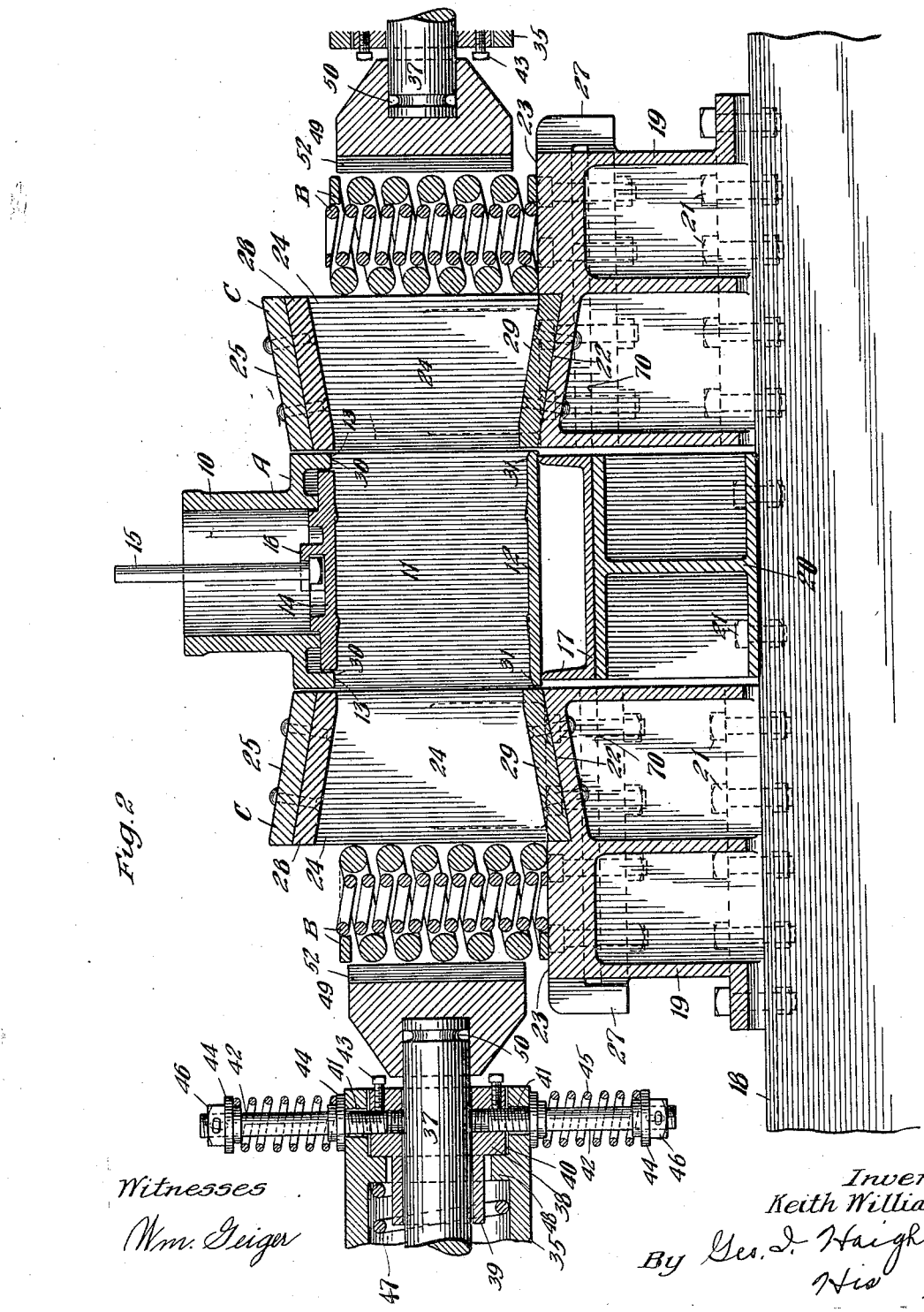

Patented Feb. 12, 1924.

1,483,147

UNITED STATES PATENT OFFICE.

KEITH WILLIAMS, OF CHICAGO, ILLINOIS, ASSIGNOR TO WILLIAM H. MINER, OF CHAZY, NEW YORK.

ASSEMBLING MACHINE.

Application filed June 13, 1921. Serial No. 476,991.

*To all whom it may concern:*

Be it known that I, KEITH WILLIAMS, a citizen of the United States, residing at Chicago, in the county of Cook and State of Illinois, have invented a certain new and useful Improvement in Assembling Machines, of which the following is a full, clear, concise, and exact description, reference being had to the accompanying drawings, forming a part of this specification.

This invention relates to improvements in assembling machines.

In the art of friction draft gears, springs of exceedingly high capacity are employed for the purpose of absorbing the buffing and pulling shocks encountered in the operation of railway cars. In modern practice, the draft gears are mostly of the friction type, the friction elements being subject to wear in service. Standard practice requires that the overall length of the friction gears remain constant or substantially so and hence it has been found desirable to place the springs of such friction gears under an initial compression, when assembled, in order that the springs may gradually expand as wear on the friction element occurs to thereby compensate for the wear of the parts and thus maintain the normal overall length of the parts. Heretofore, it has been found exceedingly difficult to insert the springs of certain classes of friction draft gears under the desired initial compression on account of the high capacity of and the great force required to compress the springs even a small amount.

The object of my invention is to provide an efficient machine for assembling springs in a friction draft gear and more particularly for assembling such springs in a friction draft gear of that type known in the trade as the Miner A—18 class of friction gear, illustrations of which may be found in O'Connor Patents 1,070,058 of August 12, 1913 and 1,220,264 of March 27, 1917.

Other objects of the invention will more clearly appear from the description and claims hereinafter following.

In the drawings forming a part of this specification, Fig. 1 is an elevational view, partly in section, illustrating an assembling machine embodying my invention. Fig. 2 is a vertical sectional view taken substantially centrally of the mechanism shown in Fig. 1, the parts being shown upon a larger scale. Fig. 3 is a vertical sectional view corresponding substantially to the line 3—3 of Fig. 1. Fig. 4 is a sectional view, upon an enlarged scale corresponding substantially to the line 4—4 of Fig. 1. And Fig. 5 is a detail sectional view of a control valve employed with my improvements and corresponding substantially to the line 5—5 of Fig. 1 upon an enlarged scale.

In said drawings, the shell of the friction shock absorbing mechanism in which the springs are assembled, is indicated at A. Said shell comprises a cylindrical friction shell proper 10 and a generally rectangular spring cage proper having parallel spaced side walls 11 and an integral connecting bottom wall 12. In this type of friction gear, the sides of the casting are left open as indicated at 13—13 to permit of the insertion and removal of the springs. In such a friction draft gear a spring follower 14 is employed, located as best shown in Fig. 2. During the assembling of the springs, said follower 14 is held in proper position manually by means of a bolt 15 which is hooked into the top face of the follower under a suitable notched flange 16. Further details of the complete friction draft gear are illustrated in said patents hereinbefore referred to. The two springs, which are ultimately arranged in twin relation within the casting A, are indicated at B—B. Where the draft gears are being assembled in quantities, the castings A are placed upon a horizontally extending track preferably of channel cross-section as indicated at 17 and the castings are slid one after another into operative position within the assembling machine as hereinafter described.

In carrying out my invention I employ a suitable bed or foundation for the assembling machine, the same consisting of heavy channels 18—18 suitably rigidly united. Mounted on the bed or base formed by the channels 18—18 are two heavy side castings 19—19 and a central supporting casting 20. Said side castings 19 and central casting 20 are rigidly anchored in place by a plurality of bolts 21—21 passing thru flanges of the castings and flanges of the channels 18—18. Each of the castings 19 is formed on the top thereof with a sloping surface 22 and horizontal flat surfaces 23—23. The sloping surface 22, at its inner end, that is the end nearest the center of the machine, is on a level with the horizontal flat surfaces 23 and substantially at the same level as the top of the track 17. Applied to each casting 19 is a heavy inverted U-shaped guide C having vertical side walls 24—24 and a top wall 25 which slopes upwardly and outwardly. The lower ends of the side walls 24 are suitably laterally extended as indicated at 26—26 so that they may be rigidly bolted or otherwise secured to the casting 19 as best shown in Fig. 3. Said lateral extensions 26, at their outer ends, are formed with down-turned flanges as indicated at 27 so as to engage against the adjacent portion of the casting 19 and thus minimize any tendency of the guide C to slip inwardly and thus avoid shearing of the securing bolts. On the inner side of the upper wall 25 is secured a case hardened wear plate 28 and a corresponding wear plate 29 is secured to the sloping surface 22 of the casting 19. The inner edges of the plates 28 and 29, as clearly shown in Figure 2, are so positioned that they are slightly below and slightly above the edges 30 and 31 of the casting A, respectively. At their outer ends, the distance between the plates 28 and 29 is made somewhat greater than the free or normal height of the spring B and the outer edge of the lower plate 29 is brought flush with the horizontal face 23 of the casting 19. With the construction described, it is evident that the guides C provide tapering mouths or guide ways through which the springs B are adapted to be pushed and simultaneously compressed in their passage therethrough to and within the casting A. The outermost portions of the flat surfaces 23 form suitable tables or supports for the springs B before the same are pushed into position.

Also mounted on the base or bed formed by the channels 18—18 at the outer ends of the latter and in line with the guides C, are relatively large high capacity pneumatic cylinders D—D. Each of said cylinders is preferably formed by a central cylindrical section 32, an outer end wall 33 and an inner wall 34, the latter being of special form terminating in a cylindrical sleeve 35.

Mounted within each cylinder D is a heavy piston 36 from which extends horizontally a piston rod 37. As best shown in Fig. 2, the piston rod 37 is guided where it leaves the cylinder in a collar 38 having a sleeve 39. The collar 38 is of lesser diameter than the recess 40 in which it is located so as to adapt collar 38 for a limited amount of movement. The sleeve 35, at its free end, is provided with four openings 41—41 arranged 90° apart. Through each of said radially arranged openings 41 loosely extends a bolt 42 which is adjustably screwed at its inner end to the collar 38. Each bolt 42 is held in its adjusted position with respect to the collar by set-screw 43. On each bolt 42 outside of the sleeve 35 are mounted washers 44—44 between which is interposed a spring 45. The outermost washer 44 is adjustably held in position by a nut 46 threaded to the outer end of the bolt 42. With this construction, it is evident that the collar 38 which provides the guide for the piston rod 37, is adapted to move a limited distance in any direction within a vertical plane under spring resistance to thereby accommodate itself to variations in position of the end of the piston rod as hereinafter explained.

Within each cylinder D and surrounding each piston rod 37 is a return spring 47 bearing at one end against the piston 36 and at its other end against an inwardly extended annular collar 48 in the sleeve 35. Said spring 47 operates to return the piston 36 to normal position after each stroke, as will be understood.

Mounted on the outer free end of each piston rod 37, is a pressure block 49. The attachment is made angularly adjustable by means of an annular groove 50 on the piston rod and a set-screw 51 mounted in the block 49. At its end adjacent the spring B, each block 49 is formed with a vertically extending cylindric surface 52 corresponding to the circumference of the spring and of a sufficient height to engage most of the coils of the spring.

The pistons are actuated preferably by means of compressed air supplied through a pipe 53. A valve fitting 54, as best shown in Fig. 5, is included in the piping system, said fitting having a control valve 55 adapted to be operated by a suitable lever 56. A supply pipe 57 extends from the valve fitting 54, said pipe 57 branching through a T 58 into two pipes 59—59, each of which leads to a cylinder in back of the piston as clearly shown in Fig. 1. An exhaust pipe 60 is connected with the valve fitting 54 as shown in Fig. 5. The valve fitting is formed with a passage 61 in line with the pipes 53 and 57 and with a communicating passage 62 leading to the exhaust pipe 60. The valve proper 55 has corresponding main port 63 and exhaust port 64.

When the valve is in the condition shown in Fig. 5, it is evident that the compressed air will readily exhaust from the cylinders out through the pipe 57 through the port 64 and port 63 to the exhaust pipe 60. When it is desired to supply compressed air to the cylinders, the valve 55 is rotated in a direction indicated by the arrow $x$ so as to bring the port 63 in line with the pipes 53 and 57 and shut off communication with the exhaust pipe 60.

The operation is as follows: A casting A with spring follower 14 therein is brought into position opposite the two guides C—C. Two springs B—B are then placed in position as shown in Fig 2. The operator next admits the compressed air to the cylinders D—D, thereby forcing the pistons 36 to move toward the guides which causes the two springs B—B to be forced simultaneously toward each other through the guides C—C and within the casting A. The springs B will be compressed in passing through the tapered guides and will be delivered under such compression within the casting A. The insertion of the two springs is simultaneous and uniform and the assembling may be carried out at comparatively high speed and practically as fast as laborers can move the castings A and springs B into position.

Inasmuch as all castings of the type shown in the drawings for friction draft gears do not have the same height of opening 13 thru which the springs are inserted, I provide a simple method of adapting my machine to such different sizes of castings A. For this purpose I may employ heavy shims 70 between the castings 19 and the flanges 26 of the guides C. By inserting or omitting such shims, it is evident that the height of the sloping top plate 28 of each guide C may be varied to bring the lower edge of such plates slightly below the edges of the casting A, as best shown in Fig. 2.

I have herein shown and described what I now consider the preferred manner of carrying out the invention and a specific instance of the use of the machine. All changes and modifications are contemplated that come within the scope of the claims appended hereto.

I claim:

1. In an assembling machine of the character described, the combination with a spring guiding and contracting means through which a spring is adapted to be forced; of a support adjacent the delivery end of said guide means on which an article is adapted to rest while having the spring inserted therein; a support at the admission end of said guide means on which a spring is adapted to rest prior to being forced through the guide; and power actuated means, including a reciprocating plunger, in alinement with the guide means arranged to force the spring through the guide means into the said article.

2. In an assembling machine of the character described, the combination with a rigid guide tapered inwardly from its admission to its delivery end and through which a spring is adapted to be forced and compressed in its passage therethrough; of a support adjacent the delivery end of said guide on which an article is adapted to rest while having the spring inserted therein; a support at the admission end of said guide on which the spring is adapted to rest prior to being forced through the guide; and power actuated means in alinement with the guide arranged to force the spring through the guide into said article.

3. In an assembling machine of the character described, the combination with a pair of aligned but oppositely disposed guides through each of which a spring is adapted to be forced; of a support intermediate said guides, said support being adapted to sustain the articles into which the springs are to be inserted; a support at the outer end of each guide on which a spring is adapted to rest prior to being forced through the guide; and power actuated means in alinement with each guide adapted to force a spring through the guide into the article.

4. In an assembling machine of the character described, the combination with two spaced guides each of which is tapered inwardly from its outer end toward its inner end; of a support intermediate said guides on which is adapted to rest the article into which the springs are to be inserted; a support at the outer end of each of said guides on which a spring is adapted to be placed prior to its passage through the guide; and power actuated means opposite the outer end of each guide adapted to force the springs through the guides, the springs being compressed in their passage through the tapered guides.

5. In an assembling machine of the character described, the combination with a pair of aligned but oppositely disposed guides through each of which a spring is adapted to be forced; of a support intermediate said guides, said support being adapted to sustain the article into which the springs are to be inserted; a support at the outer end of each of said guides on which a spring is adapted to rest prior to being forced through the guide; and power actuated means in alinement with each guide adapted to force a spring through the guide into the article, each of said power actuated means including a cylinder and a piston; and means for actuating said pistons simultaneously.

6. In an assembling machine of the character described, the combination with two spaced guides each of which is tapered inwardly from its outer end toward its inner end; of a support intermediate said guides on which is adapted to rest the article into which the springs are to be inserted; a support at the outer end of each of said guides on which a spring is adapted to be placed prior to its passage through the guide; and power actuated means opposite the outer end of each guide adapted to force the springs through the guides, the springs being compressed in their passage through the tapered guides, each of said power actuated means including a cylinder and a piston; and manually controllable means for simultaneously operating said pistons.

7. In an assembling machine of the character described, the combination with a support for an article into which a spring is adapted to be inserted; of a tapered guide adjacent said support and through which a spring is adapted to be forced and simultaneously compressed in its passage therethrough; a cylinder in alinement with said guide; a piston operated plunger movable toward and from said guide; and yieldably mounted guiding means for said plunger carried by said cylinder.

8. In an assembling machine of the character described, the combination with a centrally disposed support for an article such as a friction gear shell; of oppositely arranged inwardly converging guide ways on each side thereof through which coil springs are adapted to be forced and simultaneously compressed in their passage therethough; supports on the outer side of each guide on which the springs are adapted to be placed prior to their passage through the guides; a pneumatically operated reciprocating plunger on the outer side of each guide in alinement therewith adapted to force a spring through the guide; and a yieldably supported guide for each plunger.

In witness that I claim the foregoing I have hereunto subscribed my name this 9th day of June, 1921.

KEITH WILLIAMS.

Witnesses:
CARRIE GAILING,
ANN BAKER.